(12) United States Patent
Fritsch et al.

(10) Patent No.: US 6,189,985 B1
(45) Date of Patent: Feb. 20, 2001

(54) MAGNET VALVE FOR A SLIP-CONTROLLED HYDRAULIC VEHICLE BRAKE SYSTEM

(75) Inventors: Siegfried Fritsch, Sonthofen; Martin Kirschner, Rettenberg, both of (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/254,273

(22) PCT Filed: May 28, 1997

(86) PCT No.: PCT/DE97/01086
§ 371 Date: May 28, 1999
§ 102(e) Date: May 28, 1999

(87) PCT Pub. No.: WO98/09856
PCT Pub. Date: Mar. 12, 1998

(30) Foreign Application Priority Data

Sep. 3, 1996 (DE) ............................................. 196 35 691

(51) Int. Cl.⁷ ...................................................... B60T 8/36
(52) U.S. Cl. .................. 303/119.2; 251/129.02; 251/367; 137/550; 137/599
(58) Field of Search .............................. 303/119.2, 116.1, 303/9.75; 251/129.02, 367; 137/550, 599

(56) References Cited

U.S. PATENT DOCUMENTS

| | | | |
|---|---|---|---|
| 4,420,140 | * 12/1983 | Gachot | 25/152 |
| 4,621,788 | * 11/1986 | DeLew et al. | 251/120 |
| 4,993,684 | * 2/1991 | Prina | 251/367 |
| 5,356,211 | * 10/1994 | Fritsch | 303/119.2 |
| 5,795,038 | * 8/1998 | Fuller et al. | 303/119.2 |
| 5,887,956 | * 3/1999 | Rausch | 303/119.2 |
| 5,931,179 | * 8/1999 | Megerle et al. | 137/15 |

* cited by examiner

*Primary Examiner*—Robert J. Oberleitner
*Assistant Examiner*—Xuan Lan Nguyen
(74) *Attorney, Agent, or Firm*—Ronald E. Greigg; Edwin E. Greigg

(57) ABSTRACT

A rodlike magnet valve having a magnetic part which is surrounded by a coil for actuating the valve. The magnet valve can be inserted into a receiving bore of a hydraulic block of a slip-controlled vehicle brake system. For fast, economical manufacture of the magnet valve, the magnet valve has a rotationally symmetrical base body, which has a through bore and a securing flange, as an extruded part without undercuts or tapered features. Along with the advantage of enabling fast, inexpensive manufacture of its base body, the magnet valve has the further advantage that the base body can be made from an economical reforming steel, which can be readily welded for fluid-tight mounting of a valve dome.

4 Claims, 1 Drawing Sheet

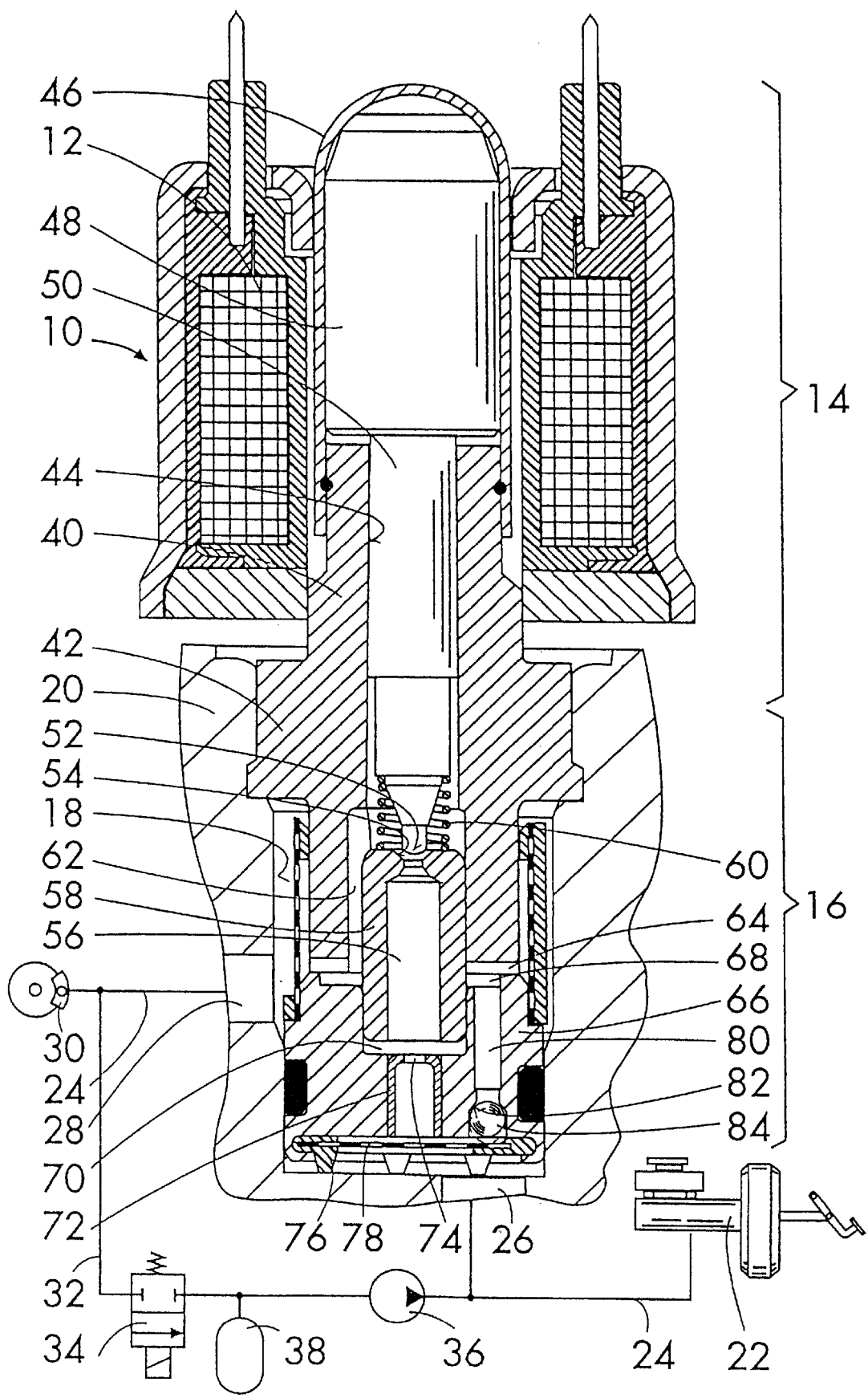

MAGNET VALVE FOR A SLIP-CONTROLLED HYDRAULIC VEHICLE BRAKE SYSTEM

PRIOR ART

The invention is based on a magnet valve, which is intended for insertion into a receiving bore in a hydraulic block of a slip-controlled hydraulic vehicle brake system.

One such valve is known from German Patent Disclosure DE 44 12 648. The known valve has a rodlike base body, which is insertable by one end into a receiving bore of a hydraulic block, so that it can be hydraulically connected to other components of the vehicle brake system. A valve dome, in which an armature is axially displaceably received, is mounted on an end of the base body that protrudes from the hydraulic block. The base body is provided with an axial through bore into which an armature-actuated valve tappet protrudes that in turn actuates a valve closing body. A valve seat part is inserted into the through bore of the base body from another end, located in the receiving bore. For actuation of the known magnet valve, a coil is slipped onto the valve dome.

The base body of the known magnet valve is a turned part; that is, it is produced by metal-cutting machining. To secure it in the receiving bore of the hydraulic block, a radially protruding securing flange is mounted on it; this requires that it be provided with a groove, countersunk feature or the like, or in other words with an undercut. In addition, a transverse bore is provided in the region of the valve closing body and of a valve seat, through which bore fluid can flow out after passing through the valve seat. The transverse bore requires a second work operation, in which the base body has to be clamped to a drilling machine. This makes the base body expensive to manufacture. Another factor is that as the material for the base body, a steel must be used that can be machined well in metal-cutting fashion and that moreover is be readily weldable, to enable the valve dome to be welded on in fluid-tight fashion. For a steel to be both readily machinable by metal cutting and weldable requires meeting two contrary demands. For the base body of the known magnet valve, a special steel is therefore used, which can be both machined by metal cutting and welded, but is consequently relatively expensive.

ADVANTAGES OF THE INVENTION

The base body of the magnet valve of the invention enlarges its cross section from its two face ends up to a point of maximum cross section, for instance in graduated or conical form, or has a constant cross section over a longitudinal portion. The point of maximum cross section may also be located on one face end. It may also be located in the middle region of the base body, for instance in the form of an annular disklike securing flange that is integral with the base body (claim 3). For the through bore of the base body, the fact that its cross section remains exclusively enlarged or constant from the face ends up to a point of maximum cross section means that the bore cross section remains reduced or constant. The base body of the magnet valve of the invention accordingly has no tapered feature between its face ends and the point of maximum cross section, and thus has no undercut from the direction of its face ends. This has the advantage that the base body can be produced by extrusion, in particular by cold extrusion. This has the advantage on the one hand of employing a fast, economical production process. It has the further advantage that an economical reforming steel with the property of good weldability can be used for the base body.

It is advantageous in accordance with claim 1 to provide grooves, extending longitudinally from the face end to be inserted into the receiving bore of the hydraulic block until the region of the valve closing body and the valve seat, in the form of outlet conduits in the through bore of the base body. These grooves can be produced in the extrusion process, so that no further operation or work step is needed. Another advantage of this feature of the invention is a 180° deflection of the outflow: Fluid flowing through the valve seat axially from the face end located in the receiving bore is deflected by 180° into the grooves acting as outlet conduits in the wall of the through bore of the base body, that is, by 180°. This deflection of the flow through the valve lends an impetus to the valve tappet that reinforces the opening of the magnet valve.

Mounting an end piece on the face end of the base body to be inserted into the receiving bore of the hydraulic block, as defined by claim 7, has the advantage that the base body itself can be made shorter, thus facilitating its production by extrusion. A further advantage is that the outflow from the axially parallel grooves in the through bore can be deflected radially to the circumference in a simple way, without requiring a further operation on the base body, and at the circumference it reaches an outlet conduit that discharges at the circumference of the receiving bore of the hydraulic block.

BRIEF DESCRIPTION OF THE DRAWING

The invention will be described in further detail below in terms of an exemplary embodiment shown in the drawing. The sole drawing FIGURE is an axial section through a magnet valve of the invention.

DESCRIPTION OF THE EXEMPLARY EMBODIMENT

The magnet valve 10 of the invention, shown in the drawing, is substantially rodlike and for its actuation has an annular coil 12, which is slipped onto one end, which is the end that forms a magnetic part 14. With its other end, which forms a hydraulic part 16, the magnet valve 10 is inserted into a receiving bore 18 of a hydraulic block 20.

By means of the hydraulic block 20, the magnet valve 10 is hydraulically connected with further components of a slip-controlled vehicle brake system. In the drawing, the vehicle brake system is shown greatly simplified and with hydraulic switching symbols. With a bore hereinafter called the inlet 26 in the hydraulic block 20, a master brake line 24 arriving from a master cylinder 22 discharges in a bottom face of the receiving bore 18 for the magnet valve 10. A bore hereinafter called an outlet 28 discharges at the circumference of the receiving bore 18. From it, the master brake line 24 leads onward to a wheel brake cylinder 30. A return line 32, connected as a bypass around the magnet valve 10, leads from the wheel brake cylinder 30 back to the master cylinder 22 via an outlet valve 34 and a return pump 36. A reservoir 38 is connected to the return line 32 between the outlet valve 34 and the return pump 36. The magnet valve 10 of the invention forms an inlet valve for the wheel brake cylinders 30. an inlet valve and with the outlet valve 34 and the return pump 36.

The magnet valve 10 has a rotationally symmetrical, rodlike base body 40, with which a disklike securing flange 42 is integral, the securing flange being located approximately in the middle longitudinally of the base body 40. On it, the magnet valve 10 is secured in fluid-tight fashion in the receiving bore 18 at an orifice thereof by caulking of the material comprising the hydraulic block 20.

The base body 40 is an extruded part. It has steplike or conical widened features on its outer surface from both face ends to its securing flange 42, where it has its maximum outer diameter. The base body 40 has no tapered features, undercuts or the like from its face ends in the direction of the securing flange 42, however, so that it can be produced in a single operation by cold extrusion without remachining.

The base body 40 is provided with an axial through bore 44 that is made in the same cold extrusion process.

This bore has no widened features whatever from the face ends of the base body 40 into the interior of the through bore 44, which means in other words that widening its through bore 44 does not enlarge the cross section of the base body. As a result, the base body 40, including its through bore 44, can be made in a single operation by cold extrusion.

A valve dome 46 is mounted on the base body 40 on the face end of the magnetic part 14 and is welded in fluid-tight fashion to the base body. An armature 48 is axially displaceably supported in the valve dome 46, and a valve tappet 50 extends from the armature in the through bore 44 as far as the hydraulic part 16 of the magnet valve 10. An end of the valve tappet 50 remote from the armature is embodied in spherical form as a valve closing body 52. The valve closing body 52 cooperates with a conical valve seat 54, which is embodied on an orifice, toward the valve tappet 50, of an axial bore 56 of a valve seat part 58. The valve seat part 58 is a turned part, which is press-fitted from a face end remote from the armature into the through bore 44 of the base body 40.

A helical compression spring 60 is braced on the face end of the valve seat part toward the armature 48 and presses the valve tappet 50 away from the valve seat part 58, so that the magnet valve 10 is opened when in its basic position. If current is supplied to the coil 12, the armature 48 is magnetically attracted to the base body 40, and via the valve tappet 50 the closing body 52 is pressed against the valve seat 54, counter to the force of the helical compression spring 60, so that the magnet valve 10 is closed.

Three longitudinal grooves of round cross section are mounted as outflow conduits 62 in a wall of the through bore 44 in the base body 40, distributed over the circumference (in the drawing, only one outflow conduit 62 is visible). The outflow conduits 62 extend along the outer circumference of the valve seat part 58 from an interstice between the valve seat 54 and the valve tappet 50 as far as the face end, remote from the armature, of the base body 40. These outflow conduits 62 are made in a single operation, in the cold extrusion of the base body 40. They discharge into radial grooves 64, through which the outflow to the circumference of the magnet valve 10 is effected. Fluid entering the magnet valve through the axial bore 56 in the valve seat part 58 is accordingly deflected, after flowing through the valve seat 54, by 180° into the outflow conduits 62, which extend axially parallel along the outer circumference of the valve seat part 58.

An end piece 66 made as a turned part is press-fitted onto an end, protruding from the base body 40, of the valve seat part 58. This end piece has an annular chamber 68, on its face end toward the base body 40, into which the outflow conduits 62 discharge and with which the radial grooves 64 leading to the circumference of the magnet valve 10 communicate.

The end piece 66 is pierced by a stepped inflow bore 70, with whose larger-diameter portion the end piece 66 is press-fitted onto the end of the valve seat part 58 that protrudes from the base body 40. A cup-shaped throttle element 72, made of sheet metal by deep drawing, is press-fitted into the smaller-diameter portion and has a bore in its bottom face that acts as a throttle 74.

The valve stroke length is set by means of the depth to which the valve seat part 58 is press-fitted into the base body 40. Either the valve seat part 58 is first press-fitted into the base body 40 so far that the desired valve stroke exists. Next, the end piece 66 is press-fitted onto the protruding end of the valve seat part 58. In that case, the compression of the valve seat part 58 in the base body 40 must be greater than the compression of the end piece 66 on the valve seat part 58, so that the depth to which the valve seat part 58 is press-fitted into the base body 40, and thus the valve stroke, will not vary later. A second option is first to press-fit the valve seat body 58 into the end piece 66 and then to press-fit both of these parts together into the base body 40. The valve stroke length is then set by press-fitting the valve seat part 58 deeper into the base body 40, until the desired valve stroke is achieved. This press-fitting is effected through the stepped bore 70 of the end piece 66, before the throttle part 72 is press-fitted into the end piece 66.

The end piece 66 is braced against the bottom face of the receiving bore 18 in the hydraulic block 20 via support feet 76 of a filter screen 78, which is spray-coated with plastic and is mounted on a face end remote from the base body 40 by crimping the end piece 66 over onto it.

A through bore 80 is provided eccentrically and axially parallel in the end piece 66; with a cone forming a valve seat 82, it widens in the direction away from the base body 40 and toward the bottom of the receiving bore 18. A ball located in the through bore 80 forms a valve closing body 84, which is retained in the through bore 80 by the filter screen 78. The through bore 80 in the end piece 66, with its valve seat 82 and the ball as a valve closing body 84, forms a check valve through which there can be a flow from the radial grooves 64 and the annular chamber 68, or in other words from the outlet 28 to the inlet 26 of the magnet valve 10. The foregoing relates to preferred exemplary embodiments of the invention, it being understood that other variants and embodiments thereof are possible within the spirit and scope of the invention, the latter being defined by the appended claims.

What is claimed is:

1. A magnet valve (10) for insertion into a receiving bore (18) of a hydraulic block (20) of a slip-controlled hydraulic vehicle brake system, a base body (40) which has a through bore (44) and can be inserted into the receiving bore (18) of the hydraulic block (20), a valve dome (46), which is mounted on the base body (40) coaxially to the through bore (44) and in which an armature (48) is axially displaceably received and which is surrounded by a coil (12), a valve seat part (58) with a valve seat (54), which is inserted remote from the armature into the through bore (44) of the base body (40), an armature-actuated valve tappet (50) with a valve closing body (52) in the through bore (44), and a fluid-carrying connection between a chamber, in the through bore (44) toward the closing body, and the circumference of the magnet valve (10), the base body (40) is an extruded part;

at least one longitudinal groove (62) extends in the wall of the through bore (44) of the base body (40), between the chamber toward the closing body of the through bore (44), along the valve seat part (58) to the face end of the base body (40) remote from the armature, at least one radial groove (64) extends at the face end, remote from the armature, of the base body (40) and leads to the circumference of the magnet valve (10), the longitudinal groove (62) and the radial groove (64) are in fluid-carrying communication.

2. The magnet valve according to claim 1, in which a cross section of the base body (40) remains exclusively constant from its face ends to a point of maximum cross section, and that the base body (40), at the point of maximum cross section, has a securing flange (42) with which the magnet valve (10) is secured to an orifice of the receiving bore (18) of the hydraulic block (20).

3. The magnet valve according to claim 1, in which the valve seat part (58) protrudes past the face end, remote from the armature, of the base body (40) and on a protruding end is provided with an end piece (66) slipped onto the protruding end, which piece toward the base body has an annular chamber (68) into which the longitudinal groove (62) discharges and with which the radial groove (64) of the base body (40) communicates.

4. The magnet valve according to claim 3, in which the end piece (66) has an axially extending inflow bore (70), which is in fluid-carrying communication with the valve seat (54) through an axial bore (56) of the valve seat part (58), and for receiving a circumferential seat, a filter screen (78) on the face end, a throttle part (72) in the inflow bore (70), and a check valve (82, 84), the end piece (66) is embodied in a through bore (80) extending, axially parallel to the inflow bore (70), from the face end remote from the base body to the annular chamber (68).

* * * * *